Inventors:
Lawrence J. Broutman,
Robert J. Szucs,
by: Harry M. Saragovitz,
Edward J. Kelly,
Herbert Berl &
Charles F. Murphy
Attorneys

3,573,150
TRANSPARENT ARMOR

Lawrence J. Broutman, Skokie, and Robert J. Szuch, Blue Island, Ill., assignors to the United States of America as represented by the Secretary of the Army
Filed July 24, 1968, Ser. No. 747,220
Int. Cl. B32b 17/04; F41h 1/02, 5/08
U.S. Cl. 161—55                                    7 Claims

ABSTRACT OF THE DISCLOSURE

Laminated armor material having high resistance to penetration by small arms missiles comprising an outer lamina having glass rods or ceramic rods embedded in a polymeric matrix and one or more inner polymeric laminae, the several laminae being cemented together, and method of making the same.

---

The invention described herein may be manufactured, used, and licensed by or for the Government for governmental purposes without the payment to us of any royalty thereon.

This invention relates to laminated armor material having high resistance to penetration by small arms missiles and to a method of making the laminated armor material. More particularly, the invention relates to laminated armor material which is transparent and, therefore, useful as armor material for protecting the face, and more particularly the eyes, against small arms missiles and shrapnel.

The production of laminated plate or sheet structures comprising organic polymeric laminae and glass laminae cemented together is well-known in the window glass art and particularly in the manufacture of safety glass for automobile windshields and windows. Also, bulletproof glass made of laminated glass plates is known, but has the disadvantage of being extremely heavy for a given capability of stopping small arms missiles. Laminates of organic polymeric sheets or plates are also known; but their resistance to penetration by bullets is appreciably less than that of bulletproof glass, therefore requiring such a great thickness to obtain sufficient capability of stopping small arms missiles as to make such structures impractical for use in portions of body armor where it is important to prevent penetration by small arms missiles, such as the eyepieces of goggles. It is also well-known to reinforce organic polymeric sheets by means of glass fibers, the glass fibers in random form, as in glass wool, being impregnated with the organic polymeric material and the combination molded into whatever form is desired in the final product. The latter types of composite materials are usually relatively weak ballistically, having little resistance to penetration by small arms missiles and being at best only translucent insofar as optical characteristics are concerned.

An object of the invention is to provide a laminated armor material having high resistance to penetration by small arms missiles.

A further object of the invention is to provide a lightweight laminated armor material which is transparent and which is highly resistant to penetration by small arms missiles.

A further object of the invention is to provide a method of making laminated armor material having high resistance to penetration by small arms missiles and, preferably being transparent.

Other objects and advantages will appear from the following description and several embodiments of the invention, and the novel features will be particularly pointed out hereinafter in connection with the appended claims.

In the specification and claims, small arms missiles are understood to be missiles of up to about .50 caliber fired by hand-held guns. In general, at the present time, .22 caliber missiles are about the smallest missiles for which armor protection is needed.

Figure 1:
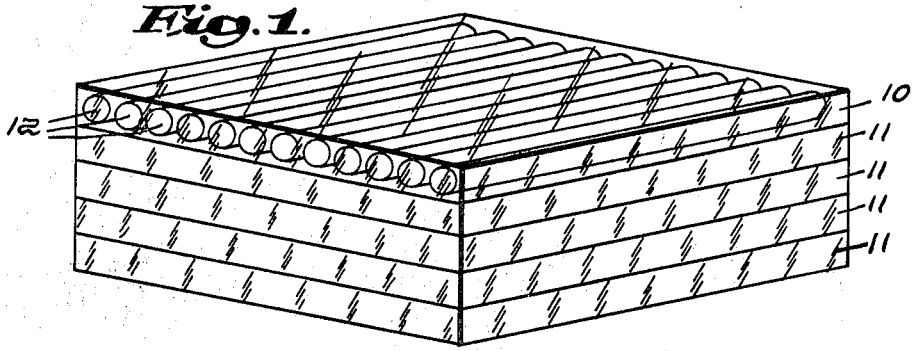
Figure 2:
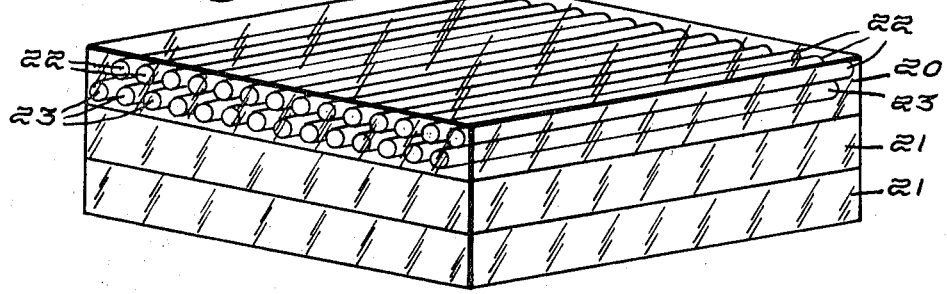
Figure 3:
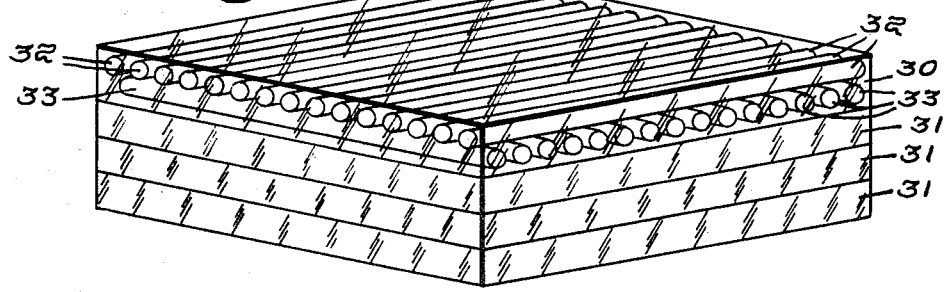

In the accompanying drawing:
FIG. 1 is a perspective view of a first laminated armor material made in accordance with this invention;
FIG. 2 is a perspective view of a second armor material made in accordance with the invention; and
FIG. 3 is a perspective view of a third laminated armor material made in accordance with the invention.

In the embodiment of the invention shown in FIG. 1, the laminated armor material illustrated comprises an outer lamina 10 and four inner laminae 11. The outer lamina comprises a series of rods 12 of glass or ceramic, preferably strengthened in a manner to be described, arranged and held in spaced parallel relation in a single plane until a matrix of a polymeric material is formed in a flat plate-like structure with the rods embedded in the polymeric material and separated a finite distance from each other. Each rod is, therefore, separated from the nearest other rod by polymeric material. The inner laminae are made of polymeric material the molecules of which are preferably oriented to strengthen the laminae. The several inner laminae are cemented together, preferably by means of a transparent polymeric cement, and the outer lamina is cemented to one of the outermost laminae of the several inner laminae, also preferably by means of a transparent polymeric cement.

The polymeric materials employed in the matrix of the outer lamina and in the inner laminae may be polyacrylates, polycarbonates, polyesters, polysiloxanes, polystyrenes, epoxy polymers, or allyl diglycol carbonate polymers. Examples of the polymeric materials which may be used are: "Plexiglas," manufactured by Rohm and Haas Co., which is a polymethylmethacrylate, a member of the polyacrylate class; "Lexan," a polycarbonate manufactured by General Electric Co.; "Paraplex P43," a polyester manufactured by Rohm and Haas Co.; blends of "Laminac 4116," a rigid polyester, and "Laminac EPX-126-3," a flexible polyester, both of which are manufactured by American Cyanamide Co.; polysiloxane, such as those manufactured by Owens-Illinois Glass Co.; polystyrene, such as those manufactured by Dow Chemical Co.; "DER 332" epoxy resin, an epoxy resin manufactured by Dow Chemical Co.; and "CR-39," an allyl diglycol carbonate polymer manufactured by Pittsburgh Plate Glass Company. The same or different polymeric materials may be incorporated in the inner laminae as well as in the matrix of the outer lamina. However, when transparency is important, it is preferred to use the same type of polymer in the inner laminae as that used in forming the matrix of the outer lamina.

The inner laminae as well as the matrix of the outer lamina may be formed directly from the polymeric materials mentioned above in the molten or thermally softened state or they may be produced by pouring liquid monomer, usually containing added catalyst, into a mold or form of suitable size and shape and allowing sufficient time for polymerization to take place. In some cases, it is desirable to subject the monomer to a vacuum while in the mold and before polymerization has taken place to a great extent in order to remove entrapped air bubbles from the liquid and thus produce a more optically homogeneous product. The vacuum may be maintained until the monomer has reacted to form a solid, if desired. The catalysts or curing agents used are those which are well-known in the arts relating to the manufacture of polymers of the types mentioned above. The polymerization conditions may be varied, depending on the polymer being produced, in order to obtain the best optical characteristics in the laminae. It is quite important that the inner and outer laminae be as clear as possible. This constitutes one of the reasons for building up the armor from several relatively thin laminae instead of casting a single, quite thick plate of armor. Since many polymerization reactions are exothermic, it is very difficult to produce relatively thick castings of polymers suitable for use in transparent armor because of shrinkage effects resulting from the high exotherms of the polymerization reactions with attendant decreases in optical quality. Furthermore, shrinkage during polymerization to a high degree in a relatively thick mass of monomer and polymer may result in fracture of thick castings. In general, it is preferred that the outer lamina be from about ½-inch to about 1-inch thick and that each of the inner laminae be not more than about ½-inch thick.

The polymeric materials of the inner laminae may be oriented, as by stretching or rolling or otherwise, to strengthen them prior to cementing the inner laminae together. When oriented inner laminae are employed, they may be arranged with respect to each other so that the polymeric molecules of the alternate laminae are oriented at right angles or the molecules of all of the inner laminae may be oriented in the same direction, if preferred, or in any other desired relationship.

The spacing between successive rode 12 of the outer lamina is such as to insure that any small arms missile which it is desired to defeat with the armor and which enters the outer lamina will be intercepted by at least one of the rods. Thus, the separation between successive rods is maintained throughout the outer lamina at no more than, and usually somewhat less than, the diameter of the cross-section of greatest area coaxial with the spin of any small arms missile which is expected to be employed against the armor.

The rods of the outer lamina may be made of any of several types of glass, such as flint glass, crown glass, borosilicate glass, or they may be made of ceramic materials, such as alumina, magnesia, or beryllia. The rods are preferably substantially cylindrical in cross section and are preferably strengthened, particularly in the case of the glass rods, prior to being embedded in the polymeric matrix material to form the outer lamina, by an etching procedure which effectively removes enough surface material to substantially eliminate surface cracks and fissures from the glass or glass-like materials, thus providing a smooth surface which in effect greatly increases the flexural strength properties of the rods.

The rods of the outer lamina may vary in diameter, but preferably will be from about 9 mm. to about 12 mm. prior to the etching thereof and will preferably be from about 5 mm. to about 10 mm. after etching, the amount of material removed from the outer surfaces of the rods depending on the material of which the rods are made, the etching bath and conditions employed, the extent of strengthening desired and, therefore, the ultimate strength of the outer lamina and degree of resistance to missiles desired therein. Unetched glass rods have average flexural strengths of from about 14,000 p.s.i. to about 19,000 p.s.i., whereas etched glass rods having flexural strengths averaging as high as 400,000 p.s.i. with individual maximum strengths running as high as 600,000 p.s.i. have been obtained using the following etching procedure.

The glass rods are washed in a dilute solution of potassium hydroxide and placed in a polyethylene holder which supports the glass rods while they are being agitated in the etching solution, the rate of agitation being about 150 cycles per minute with an amplitude of about ⅜-inch (total vertical displacement of the rods about ¾-inch). The etching solution may be varied depending on the type of glass being etched. For flint glass it is preferred to employ a mixture of about 15 percent concentrated hydrofluoric acid, 15 percent concentrated sulfuric acid, and 70 percent distilled water, these percentages being by weight. The etching solution is contained in a polyethylene cylinder which is maintained at a controlled temperature not exceeding about 40° C. The etching rate depends on the temperature and age of the etching bath. Typical etching times for reducing a 12 mm. diameter rod to a 9 mm. diameter rod (removal of an average 1.5 mm. of surface material) vary from about 8 to about 12 hours. After the etching is completed, the rods are rinsed in tap water, then in distilled water and dried, care being taken not to abrade the etched surfaces.

While ceramics, such as alumina, magnesia, and beryllia are not adaptable to the above procedure of strengthening by etching, they can be produced in high-density forms which are extremely hard and, therefore, are adaptable to use as reinforcing rods for the outer lamina of laminated armor produced in accordance with the present invention. When highly polished, rods of these ceramics transmit light; and although laminated armor comprising highly polished ceramic rods as reinforcing elements of the outer lamina may not be as transparent as laminated armor comprising etched glass rods as reinforcing elements, such armor will nevertheless be quite useful, particularly in uses where a relatively high degree of transparency is not required. Furthermore, laminated armor comprising unpolished ceramic rods as reinforcing elements of the outer lamina may be used where neither transparency nor translucency is important, for example as protection for portions of the body where visual observation through the armor is of no consequence. Much of the body surface is of this nature. Hence, the principles involved in the construction of the transparent armor of the invention may be employed in the production of body armor material which is not transparent.

When the inner and outer laminae have been produced separately as described above, they are combined to form the laminated transparent armor of the invention by cementing the several inner laminae together with transparent adhesives or cements and thereafter cementing the outer lamina containing the glass or ceramic reinforcing rods to one of the outer surfaces of the composite of inner laminae with a transparent adhesive or cement. Epoxy adhesives are particularly useful for this purpose since, when cured, they have good strength and maintain the laminae strongly adhered to each other. Also, epoxy resins are available, such as "Epon 826," manufactured by Shell Chemical Co., which have good transparency when cured. However, other types of adhesives having the desired degree of transparency and strength of bond with the laminae of the armor may be employed in assembling the armor. Pressure may be used to insure good bonding and the elimination of air bubbles from the cement and from entrapment between the laminae. This is particularly important when the laminated armor must have good optical properties as, for example, when it is to be used as an eye protective shield in some suitable form.

It has been found desirable to match up the indices of refraction and the dispersive powers of the polymeric materials and the glass of the rods used for reinforcement of the outer lamina as nearly as possible, and it is particularly desirable that these characteristics match quite closely at or near the temperature or within the temperature range in which it is expected that the transparent armor is to be used. The more closely these characteristics match, the better will be the transparency and other optical properties of the armor, for example absence of colors, distorted or blurred images, and other undesirable characteristics. Since these properties vary with temperature, it is necessary to take into account the approximate temperature at which the transparent armor is most likely to be used, or at least the temperature conditions under which good transparency is most critical, in selecting the polymers and glass or other types of reinforcing rods employed in preparing the transparent armor.

As indicated above, if transparency is not required or a high degree of transparency is not critical, very good results in terms of resistance to small arms fire can be obtained with relatively nontransparent but quite hard ceramic rods embedded in the outer lamina of the armor.

Having described the method of producing the embodiment of the invention shown in FIG. 1, it will be readily apparent that the embodiment of the invention illustrated in FIG. 2 comprises an outer lamina 20 and two inner laminae 21. The outer lamina comprises two series of rods 22 and 23 of glass or ceramic embedded in a matrix of polymeric material, the first series of rods 22 being in spaced parallel relation in a first plane and the second series of rods 23 being in spaced parallel relation in a second plane, the two planes in which the two series of rods lie being substantially parallel to each other, and the rods in both series being substantially parallel. The rods of the first or outer series lie substantially over the spaces between the rods of the second or inner series so that it would be practically impossible for a small arms missile of any kind to enter the outer lamina without being intercepted and deflected by at least one of the rods of the outer lamina. It will be readily apparent that when two or more series of rods are arranged in two or more planes so that the rods of one plane overlie the spaces between the rods of another plane, the rods may be spaced apart somewhat more than in the embodiment shown in FIG. 1. The important consideration insofar as spacing is concerned is that the rods be spaced so that any small arms missile which enters the outer lamina will be intercepted by at least one of the rods.

In the embodiment of the invention illustrated in FIG. 3, the armor comprises an outer lamina 30 and three inner laminae 31. The outer lamina comprises two series of rods 32 and 33 of glass or ceramic embedded in a matrix of polymeric material, the first or outer series of rods 32 being in spaced parallel relation in a first plane and the second or inner series of rods 33 being in spaced parallel relation in a second plane, the two planes in which the two series of rods lie being substantially parallel to each other. However, in this embodiment, the rods 33 of the second series run perpendicularly to the direction of the rods 32 of the first series. In this embodiment the spacing of the rods of at least one of the series of rods will need to be no more than that of the embodiment illustrated in FIG. 1 to insure interception of any small arms missile by at least one of the rods. The outer lamina and the several inner laminae are cemented together in a manner similar to that described above in connection with the embodiment illustrated in FIG. 1.

The laminae of the embodiments illustrated in FIGS. 2 and 3 are prepared from the same types of materials as described for the embodiment of FIG. 1 and they are cemented together in substantially the same manner. The essential difference between the three embodiments is in the arrangement of the reinforcing rods in the outer lamina and in the number and dimensions of the outer and inner laminae.

It will be understood that more than two series of reinforcing rods may be incorporated in the outer lamina, if desired, and that more than four inner laminae may be employed; or in certain cases requiring less ballistic protection, only one inner lamina may be incorporated in the laminated armor of the invention. The important consideration is that the outer lamina should contain enough rods of high flexural strength or hardness, preferably transparent and having refractive index and dispersive power properties which match closely these properties of the polymeric matrix of the outer lamina at least and also of the inner laminae for best overall optical properties, these rods being spaced apart and arranged preferably in one or more planes so that any missile from small arms or fragments of shrapnel will be intercepted by one or more of the rods, deflected and caused to dissipate most, if not all, of its kinetic energy within the laminated armor.

The laminated armor material of this invention is particularly useful for body armor to protect the human body against small arms missiles and shrapnel and the transparent laminated armor material of the invention is particularly useful for making the eyepieces of goggles or for windows in helmets to protect the eyes and other portions of the head while making possible good visual observation of the environment in which the wearer is operating. The transparent armor of the invention may also be used in windows of tanks and other armored carriers for members of the Armed Forces. It may also be used in the windows of armored automobiles, trains, and other conveyances.

It is understood that various changes in the details, materials, and arrangements of parts, which have been herein described and illustrated in order to explain the nature of the invention, may be made by those skilled in the art within the principle and scope of the invention as expressed in the appended claims.

We claim:

1. Laminated armor material having high resistance to penetration by small arms missiles which comprises at least one inner lamina essentially consisting of a first polymeric material selected from the group consisting of polyacrylates, polycarbonates, polyesters, polysiloxanes, polystyrenes, epoxy polymers, and allyl diglycol carbonate polymers and at least one outer lamina comprised of a second polymeric material selected from the group consisting of polyacrylates, polycarbonates, polyesters, polysiloxanes, polystyrenes, epoxy polymers, and allyl diglycol carbonate polymers, said outer lamina having a series of substantially cylindrical, non-fibrous rods of material selected from the group consisting of flint glass, crown glass, borosilicate glass, alumina, magnesia, and beryllia, said rods having diameters of at least about 5 mm. and being embedded in said second polymeric material and spaced apart no more than the diameter of the cross-section of greatest area coaxial with the spin of a small arms missile in order to intercept any small arms missiles entering said outer lamina, said laminae being cemented together by a polymeric cement to form a unitary structure.

2. Laminated armor material as claimed in claim 1, wherein said first and second polymeric materials, said rods, and said polymeric cement are transparent and have substantially the same refractive index at about the temperature at which said armor is to be used.

3. Laminated armor material as claimed in claim 2, wherein the surfaces of said rods are etched to increase their flexural strength.

4. Laminated armor material as claimed in claim 3, wherein the molecules of said laminae essentially consisting of said first polymeric material are oriented to increase the strength of said laminae.

5. Laminated armor material as claimed in claim 4, wherein said rods have diameters of from about 5 mm. to about 12 mm.

6. Laminated armor material as claimed in claim 1, wherein said outer lamina has at least two series of rods of material selected from the group consisting of flint glass, crown glass, borosilicate glass, alumina, magnesia, and beryllia embedded in said second polymeric material, at least one of said series of rods being in spaced parallel relation in a first plane and at least one other of said series of rods being in spaced parallel relation in a second plane, the rods of said other series lying substantially perpendicular to the rods of said one series.

7. Laminated armor material as claimed in claim 1, wherein said outer lamina has at least two series of rods of material selected from the group consisting of flint glass, crown glass, borosilicate glass, alumina, magnesia, and beryllia embedded in said second polymeric material, at least one of said series of rods being in spaced parallel relation in a first plane and at least one other of said series of rods being in spaced parallel relation in a second plane, the rods of said other series lying substantially parallel to the rods of said one series and overlying the spaces between the rods of said one series.

References Cited

UNITED STATES PATENTS

| | | | |
|---|---|---|---|
| 2,143,796 | 1/1939 | Phillips | 65—31 |
| 2,758,951 | 8/1956 | Case | 161—60 |
| 3,000,772 | 9/1961 | Lunn | 161—203X |
| 3,135,645 | 6/1964 | Burkley et al. | 161—404X |
| 3,380,406 | 4/1968 | Gosnell | 161—404X |
| 3,391,050 | 7/1968 | Nebesar | 161—60X |
| 3,472,730 | 10/1969 | Frigstad | 161—185X |

JOHN T. GOOLKASIAN, Primary Examiner

R. A. KILLWORTH, Assistant Examiner

U.S. Cl. X.R.

2—2.5; 89—36; 161—5, 60, 175, 183, 185, 193, 194, 204, 404